United States Patent [19]

Golben

[11] 4,377,209

[45] Mar. 22, 1983

[54] THERMALLY ACTIVATED METAL HYDRIDE SENSOR/ACTUATOR

[75] Inventor: Peter M. Golben, Montvale, N.J.

[73] Assignee: The United States of America as represented by the Secretary of the Interior, Washington, D.C.

[21] Appl. No.: 229,698

[22] Filed: Jan. 27, 1981

[51] Int. Cl.³ .............................................. A62C 35/02
[52] U.S. Cl. ........................................ 169/26; 169/60
[58] Field of Search ...................... 169/60, 62, 56, 58, 169/59, 20, 26, 81; 252/410, 181.7; 423/644, 648 R, 248; 222/83

[56] References Cited

U.S. PATENT DOCUMENTS

| | | | |
|---|---|---|---|
| 1,933,694 | 11/1933 | Allen et al. | 169/26 |
| 3,464,497 | 9/1969 | Globerman et al. | 169/62 |
| 3,465,827 | 9/1969 | Levy et al. | 169/62 |
| 3,642,071 | 2/1972 | Utesch, Jr. | 169/60 |
| 3,688,846 | 9/1972 | Lease | 169/62 |
| 3,776,313 | 12/1973 | DePalma | 169/26 |
| 4,161,401 | 7/1979 | Sandrock | 423/644 |
| 4,242,315 | 12/1980 | Bruning et al. | 423/644 |
| 4,282,931 | 8/1981 | Golben | 222/83 |

Primary Examiner—F. J. Bartuska
Assistant Examiner—Kenneth Noland
Attorney, Agent, or Firm—Thomas Zack; Donald A. Gardiner

[57] ABSTRACT

A fire protection system which senses the fire and actuates the dispensing of a fire suppressant without the use of electronics or electrical devices. This invention utilizes the process known as occlusion to storage large amounts of hydrogen gas in relatively small confined volumes. When an external heat source is presented to the system, such as that from a fire and/or explosion, the storaged hydrogen—via a metal hydride—is released and thereby builds up a pressure in its confined volume. This pressure is used to do work, namely moving a piston. After the piston moves a predetermined distance, it actuates the release of a gas which in turn fluidizes a dry powder suppressant which is dispensed via hoses and nozzles to the same fire and/or explosion. After the fire is suppressed, cooling of the metal hydride occurs which causes the hydrogen gas to reenter the metal hydride and the pressure in the piston to decrease. A reset spring acting against the pressure build up in the piston volume then resets the system to its initial position for future use.

4 Claims, 2 Drawing Figures

U.S. Patent   Mar. 22, 1983   4,377,209
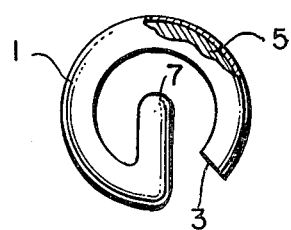
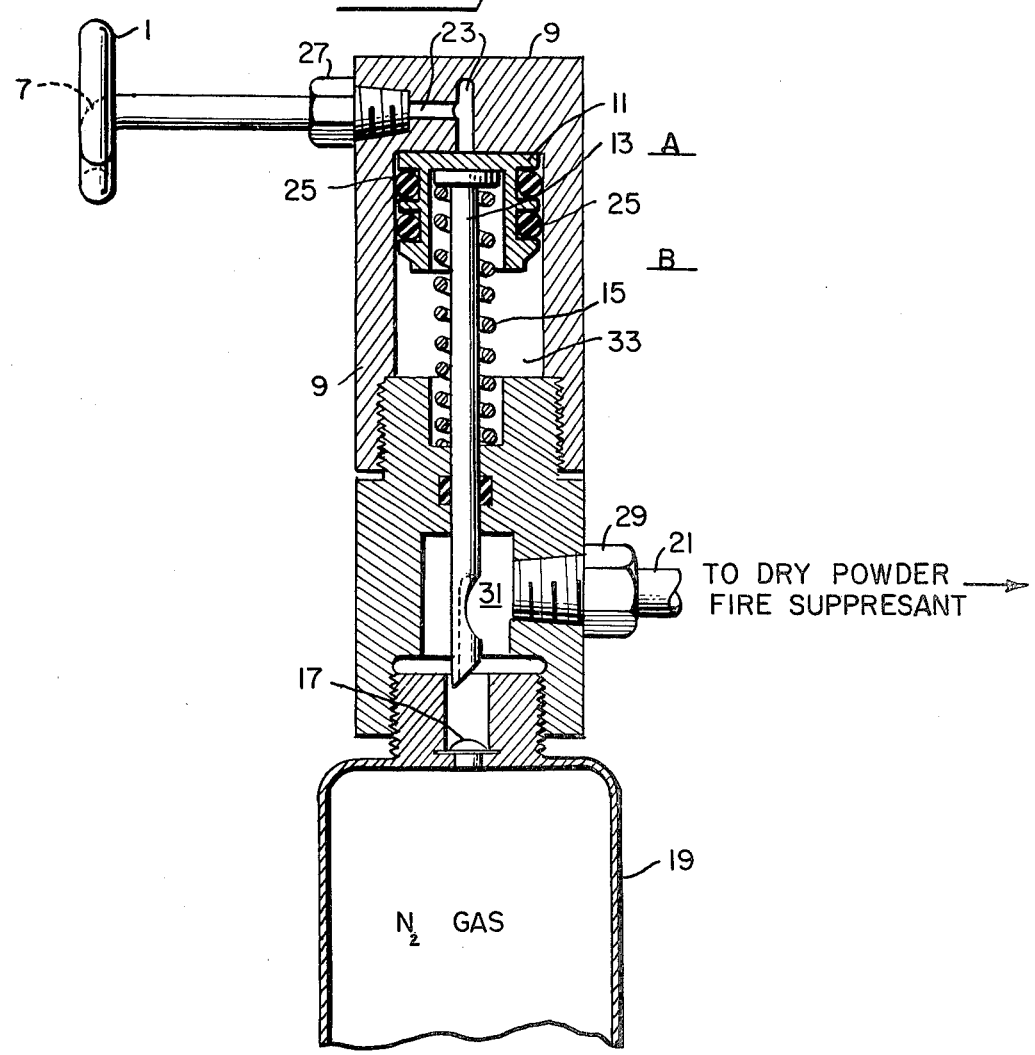

THERMALLY ACTIVATED METAL HYDRIDE SENSOR/ACTUATOR

BACKGROUND OF THE INVENTION

1. Field of the Invention

The invention disclosed herein relates to a metal hydride actuation device specifically designed to be actuated by an ambient fire and/or explosion.

2. Description of the Prior Art

The closest known invention relating hereto is the metal hydride actuation device disclosed and claimed by my copending United States patent application bearing Ser. No. 114,522, filed Jan. 23, 1980 now U.S. Pat. No. 4,282,931. The contents of that disclosure are specifically referred to as prior art herein. The essential difference between that invention and the invention disclosed herein relate to the fact that this invention was specifically designed and constructed to be electronic free in operation and the heat source to activate its operation was the very same fire and/or explosion which is to be suppressed. This is accomplished by using one or more spot sensors and a system completely void of electrical or electronic devices of any kind.

Fire protection systems may be actuated to trigger fire suppressant devices by a variety of methods. Much of this prior art is disclosed in my incorporated prior application. Perhaps the closest in overall operation is a SCAD system manufactured by the Ansul Company (Marinette, Wisconsin 54143). In that system, a meltable plastic tube is strung around high fire probability areas. For example, a vehicle useable in a mine could have the tubing placed around its engine and hydraulic systems. This tubing is internally pressurized with nitrogen ($N_2$) gas to about 80 psig and has one end connected to a centralized actuator which contains a piston, a biasing spring in the piston, a puncture pin, and a high pressure $N_2$ cartridge with a diaphragm. The other end of the meltable tubing is connected to a pressure making device. The nitrogen gas acts to normally hold the piston in a compressed state against the action of the biasing spring. When a fire occurs near the tubing, it melts to release its enclosed nitrogen gas. The biasing spring then moves the piston which in turn causes the other puncture pin to shear a diaphragm of the high pressure $N_2$ cartridge. This released $N_2$ gas is then directed through hose lines to a tank of dry powder fire suppressant material. The mixture is a "fluidized" dry powder which travels through a system of hoses and nozzles to the fire. The problem with this system is twofold. There is the possibility that the pressurized plastic tubing may leak and this same tubing is susceptable to damage or breakage due to chemicals and the harsh environment it is used in. It also requires people and vehicle maintenance for its operation.

U.S. Pat. No. 4,175,667 to P. M. Poeschl et al, assigned to the aforesaid Ansul Company, relates to the same or a very similar system and discloses a double ended piston assembly with a frangible disc that is held in a cocked position under the influence of a pressurized sensor gas. When the pressure is lost, the frangible disc is fractured by a puncture element to thereby operate a responsive device such as a warning device, fire suppression system, and the like.

The essential differences between the present invention and the known prior art, including my copending patent application resides in its intrinsic simplicity, i.e., it is electronics free and actuated by the same fire it detects and seeks to suppress. These two features when viewed along with those known advantages of metal hydride have resulted in a virtually maintenance free inexpensive fire suppression system which is safe, simple, and rugged in operation and has the ability to automatically recock itself. It thus is ideally suited for use on mining machinery and other pieces of operator equipment used in dangerous explosion prone environments where automatic actuation of the fire or explosion suppressant is essential.

SUMMARY OF THE INVENTION

The thermally activated metal hydride sensor actuator which forms the subject matter of this invention utilizes a thermal hollow sensor with the metal hydride therein. This sensor is opened at one end where it is connected to a normally biased piston head with an actuator therein. The piston head is moved by the hydrogen gas released from the metal hydride, which movement causes the actuator or the puncture pin to actuate the release of a pressurized fluid. Upon release, the fluid can be used to fluidize a dry powder or release some other fire suppressant material which is dispensed towards the sensed fire.

The primary object of this invention is an improved thermally activated metal hydride device which acts both as the sensor of a fire and the actuator to cause its suppression.

DESCRIPTION OF THE DRAWINGS

FIG. 1 is a front view of the thermal sensor, per se, with a section thereof being cut away to depict its internal metal hydride.

FIG. 2 shows the thermal sensor of FIG. 1 in a side view mounted on a piston assembly which is shown in cross-sectional view and is attached to a pressurized gas cartridge.

As pointed out in my prior invention, incorporated by reference herein, metal hydrides can be used to store relatively large amounts of hydrogen gas in a small volume. Upon the application of heat this stored gas can be used to do work like move a piston against the force of a biasing spring. The piston in turn can be used to move a pin which can puncture a shearable diaphragm. Upon this happening, the contents of a container with a second gas under pressure, like nitrogen ($N_2$), is then used to actuate the fire protection system. Recocking of the piston begins as the heat being applied to the metal hydride ceases, i.e., the metal hydride cools. All of these features are described in detail in my earlier invention and these same principles of operation are incorporated to a large extent in this invention.

FIG. 1 shows the thermal sensor in the form of a stainless steel tube 1 which is sealed at its far terminal end 3. Within this tube a powder coating of a metal hydride 5 is charged to about 90 percent with hydrogen gas. The other end of the tube is opened and is adopted to be connected to a housing and a piston chamber as described with respect to FIG. 2. Thousands of metal hydrides are available for use with each possessing its own unique pressure/temperature isotherm. Normally the hydride selected to be used is custom fit to the design constraints available. This is accomplished by varying the alloy content of the hydride. The primary purpose the preferred embodiment of this invention was designed for was for fire protection equipment attached to mining equipment—like a continuous mining machine or haulage vehicle—useable in an underground mine. For this particular environment the metal hydride herein involved would have the specific design criteria set forth in the following paragraph.

The metal hydride should have a slow pressure buildup at temperatures below 100 degrees centigrade (C). This is necessary to reduce the effect of engine heat from the vehicle on the actuator. At temperatures above 100° C., the pressure from the liberated hydrogen should increase rapidly. Only a small amount of metal hydride (about 2 grams) will be used thus meaning a very small amount of heat would actually be required to raise the temperature of the hydride to its activation point. For example, if the engine on which the sensor-/actuator were mounted was to catch fire, temperatures in the order of 371° C. or 700° F. would quickly be reached. This 371° C. temperature should be well above the required activation temperature of the hydride used thereby insuring a very fast reaction. In addition to these factors, the metal hydride selected should (1) have a wide range of hydrogen to hydride ratios during the coexisting α and β phases. In other words, the plateau on the pressure-composition isotherm should be as wide and flat as possible. This condition will minimize the amount of hydride needed in the invention, and therefore minimize the amount of energy required to preform the actuation, and (2) the hydride hysteresis effect should be minimized so that it will not seriously affect readsorption concentrations of the hydrogen upon cooling. One hydride I have used successfully in tests that meets all of the criteria is a calcium-nickel alloy (CaNi$_5$).

The shape of the tubing used to form the sensor head 1 should be such that maximum surface area is exposed to the ambient air considering the amount of hydride powder contained therein. In the preferred embodiment, the tube is seen (FIG. 1) as forming an arc of approximately 315 degrees, when viewed from the front, with a straight tube section being attached to its opened back end. The arc portion of the sensor is generally in the same plane (FIG. 2) with the straight portion being joined to it approximately at the center 7.

FIG. 2 shares many components similar to the components described in the same numbered figure of my previous invention. Both have a piston housing 9, a piston head 11, a puncture pin 13, a resetting spring 15 encircling this pin, a shearable diaphragm 17 for actuating a pressurized nitrogen (N$_2$) cartridge 19, as well as an exit port and hose 21 for the N$_2$ gas to be discharged.

As before, the reset spring normally biases the piston head and its attached pin away from the diaphragm. Upon the hydrogen gas building up sufficient pressure, it will force the piston head down against its spring as this gas is received via internal housing conduit 23 from the sensor. Once the heat from the heat source—here a fire in the mine, engine, etc.—is removed, the reset spring moves the piston head and puncture pin to the initial position shown in FIG. 2 as the hydrogen gas is absorbed by the sensor's metal hydride. This recocks the system.

Other convention elements illustrated in FIG. 2 include the two piston O rings 25, the connector 27 to connect the sensor to the housing, the connector 29 to connect the lower internal chamber 31 to the N$_2$ discharge hose 21, and the upper piston chamber 33 in which the piston moves with the upper portion of the piston head moving between the initial (A) and final positions (B) illustrated.

Several additional design considerations have been looked into for the preferred embodiment. Leakage of hydrogen gas past the piston rings, especially when the unit is inactive, has been given great consideration. If this turns out to be a major problem, then a metal bellows may be substituted for the piston similar to that used in my incorporated prior invention. All components should be designed to resist the temperatures of a fire (or 1400° F.) if it is desired to make the system very rugged. Lastly, the N$_2$ cartridge diaphragm could be replaced by a valve which releases the prepressurized dry powder tank that is used to actually suppress the fire.

The test results and certain assumptions were made when the preferred embodiment was used. It was assumed the invention would be actuated once per year, the ambient temperature before the fire would be about 70° F., and the time to both actuate and reset the invention would be about 1 hour. This means 99.99% of the time the invention would be in an inactive mode. The actual test results had an ambient temperature before the fire of 65° F.; used the metal hydride CaNi$_5$ with a mass of 8.01 grams; used a 1/40D stainless steel sensor tube with a 0.065 wall thickness; used an Ansul LT-5-R nitrogen cartridge; used a piston with a head area of 0.7854 square inches that moved 0.344 inches before contacting the diaphragm, and employed a hydrogen pressure of about 7 psi absolute or—7.7 psi gauge pressure. After exposure from the flame of a propane torch played across the surface of the sensor's tubing, the invention was activated in eleven seconds and had a hydrogen gas pressure at actuation of 135 psi absolute.

Many changes can be made to the design or the preferred embodiment and the specific materials used. Heat activated switches could be used to directly respond to the ambient fire without using electronics. The moving piston could do additional work like pumping water or other liquids. Or it could be modified so that it would work as a thermostatic device that could regulate water or air flow. None of these changes or potential other uses should be used to limit or expand the scope and extent of my invention which is to be measured only by the claims that follow.

I claim:

1. A system employing a confined metal hydride material initially stored in a nongaseous state which senses an ambient fire and uses the heat therefrom to emit hydrogen in a gaseous state and to actuate the discharge of a fire suppressant material comprising:

a hollow thermal sensor used to sense the rise in temperature of ambient air, and said sensor being curved in configuration and closed on all sides except one and having a metal hydride material deposited in its hollow inner portion;

said sensor's metal hydride material while in a nongaseous state being capable of storing hydrogen gas at a given temperature range and releasing said hydrogen gas a second higher temperature corresponding to an ambient fire;

a housing with an inner cavity to receive a movable piston head, said housing and cavity being connected to said sensor at its opened side by a gas tight connection;

a movable piston head with an attached actuator mounted in the cavity of the housing, said head being moved by the release of pressurized hydrogen gas from the metal hydride when at or above the second higher temperature, corresponding to an ambient fire;

biasing means to normally bias the piston and its actuator to a first position; and a container connected to said housing by a gas tight connection, said container having its own source of pressurized fluid and means capable of being actuated by the actuator of the piston's head to release its pressurized fluid from the container when the hydride has reached its second higher temperature and, as a result, causes the piston with its actuator to move to a second position.

2. The system of claim 1 wherein:

the thermal sensor is an elongated tubular member which is bent and closed on its terminal bent end and opened on its other end;

the actuator attached to the piston head is a puncture pin; and the container means capable of being actuated is a shearable diaphragm used to close the container.

3. The system of claim 2 wherein:

the biasing means is a reset spring encircling the puncture pin; and the source of pressurized fluid is a chemically inert gas which is released to fluidize the fire suppressant material which is in the form of a dry powder.

4. The system employing a metal hydride which senses an ambient fire and uses the heat therefrom to activate the discharge of a fire suppressant material comprising:

a hollow thermal sensor to sense the rise in temperature of ambient air, said sensor being closed on all sides except one and having a metal hydride material deposited in its hollow inner portion, said sensor also having a straight section near its opened end and a bent section configured as the greater part of a circle in its remaining section;

said sensor's metal hydride material being capable of storing hydrogen gas at a given temperature range and releasing said hydrogen gas above a second higher temperature corresponding to an ambient fire;

a housing with an inner cavity to receive a movable piston head, said housing and cavity being connected to said sensor at its opened side by a gas tight connection;

a movable piston head with an attached actuator mounted in the cavity of the housing, said head being moved by the release of pressurized hydrogen gas from the hydride when the second higher temperature, corresponding to an ambient fire, is reached;

biasing means to normally bias the piston and its actuator to a first position; and a container connected to said housing by a gas tight connection, said container having its own source of pressurized fluid and means capable of being actuated by the actuator of the piston's head to release the pressurized fluid from the container when the hydride has reached its second higher temperature and, as a result, causes the piston with its actuator to move to a second position.

* * * * *